United States Patent [19]
Evans

[11] 4,363,119
[45] Dec. 7, 1982

[54] METHOD OF AND APPARATUS FOR ASSEMBLING A BELT DRIVE OF A RECORD PLAYER

[75] Inventor: Philip H. Evans, Stourbridge, England

[73] Assignee: BSR Limited, Warley, England

[21] Appl. No.: 272,193

[22] Filed: Jun. 10, 1981

[30] Foreign Application Priority Data

Jun. 13, 1980 [GB] United Kingdom ............... 8019412

[51] Int. Cl.³ .............................................. G11B 3/60
[52] U.S. Cl. ................................. 369/266; 369/292
[58] Field of Search .............................. 369/266, 292

[56] References Cited
U.S. PATENT DOCUMENTS
3,973,778 8/1976 Marks et al. ..................... 369/266

Primary Examiner—Charles E. Phillips
Attorney, Agent, or Firm—Hopgood, Calimafde, Kalil, Blaustein & Judlowe

[57] ABSTRACT

A method of assembling a belt drive of a record player includes engaging the belt around a drum of a record player, holding the belt with a hook member, engaging the turntable with a deck plate, rotating the turntable by hand until the belt engages an abutment which causes the belt to disengage the hook and engage the motor driving spindle. The invention also provides a record player for use in the method.

9 Claims, 3 Drawing Figures

METHOD OF AND APPARATUS FOR ASSEMBLING A BELT DRIVE OF A RECORD PLAYER

BACKGROUND OF THE INVENTION

This invention relates to a method of assembling a belt drive of a record player. In a belt driven record player, drive of a turntable is achieved from an electric motor by way of an endless resilient belt which may comprise a rubber band, and which passes around a spindle of the motor which projects from a deck plate of the record player and around a drum which is provided on the underside of the turntable.

There is a problem with assembling the belt drive when locating the turntable on a mounting post on the deck plate and engaging the belt around the motor spindle of the deck plate and around the drum of the turntable. This problem occurs in initial assembling and when replacing the turntable after it has been removed for a maintenance or a repair operation of the record player.

The problem arises because it is not possible with known designs of record player to gain access to said spindle and drum from below the turntable and the operation of assembling the belt drive from above is obstructed by the turntable.

To overcome this problem, it is known to provide a turntable with an aperture in such a position that a person assembling the belt drive can insert his fingers into a space below the turntable to manipulate the belt which is engaged around the drum, into position over the spindle, having presented the turntable to its mounting post on the deck plate.

In order to preserve the balance of the turntable, it is necessary to provide a further similar aperture in the turntable at a diametrically opposed position.

To cover these apertures in the turntable to prevent dust from entering the record player mechanism and for aesthetic purposes, it is necessary to provide a turntable mat in order to conceal the apertures, which mat can readily be removed when it is desired to gain access to the apertures for belt drive assembly. Provision of such a mat increases the costs of the record player and the known method of assembling necessitates unwarranted steps in production, namely making the apertures in the turntable, balancing the turntable, and placing the mat on the turntable. In known record players the assembly operation is awkward and time consuming and can prove a very difficult operation for a user of the record player who wishes to remove and replace a turntable and has had no previous experience of this operation.

A record player having a belt drive in which an endless resilient belt passes around a motor driving spindle which extends from a deck plate and around a drum provided on the underside of a turntable, the turntable being mounted for rotation on a mounting means provided on the deck plate, is hereinafter referred to as a record player of the type specified. Also, where the expressions "upper" and "lower", "vertical" and "horizontal" are used herein, these are to be taken as referring to the record player occupying its normal operative position in which the deck plate and turntable are in substantially horizontal planes.

The object of the invention is to provide an improved method of assembling a belt drive in a record player of the type specified so as to eliminate the problem in assembly hereinbefore referred to.

SUMMARY OF THE INVENTION

According to a first aspect of the invention we provide a method of assembling a belt drive of a record player of the type specified comprising engaging the belt around the drum with the turntable separated from the record player, engaging a portion of the belt under tension with holding means provided on the underside of the turntable radially outwardly of the drum, said portion of the belt forming a V formation in relation to the arcuate drum periphery, presenting the turntable, underside downwards, to the deck plate of the record player, positioning the turntable in relation to the deck plate so that the motor driving spindle is received within the V formation, engaging the turntable with the mounting means and rotating the turntable to bring one side of said V formation into engagement with an abutment of the record player deck plate, whereby said portion of the belt is caused to disengage the holding means so that said portion engages with the spindle of the driving motor.

Thus the belt may be easily assembled without having to gain access to a space beneath the turntable, through provided in the turntable. It is therefore not necessary to provide a turntable mat to conceal apertures and thus production is facilitated and cost of the unit reduced.

According to a second aspect of the invention we provide a record player of the type specified for use with the method of assembling the belt drive according to the first aspect of the invention, comprising a turntable having on its underside, a holding means spaced radially outwardly of the drum and the motor driving spindle of the deck plate, an abutment projecting upwardly from the deck plate of the record player and positioned radially outwardly of the drum.

Conveniently, the holding means forming the V formation with said portion of the belt comprises a simple hook non-captively to hold the belt by virtue of the tension of the belt, and permit easy displacement of the belt portion from the hook when the side of the V formation engages an abutment when the turntable is rotated.

The free end of the hook may face anti-clockwise in which case the turntable will need to be rotated clockwise to cause said portion of the belt to disengage the hook. Alternatively, the free end of the hook may face clockwise in which case the turntable will need to be rotated anti-clockwise to cause said disengagement.

Preferably the hook member is a separate member attached by adhesive or other means to the underside of the turntable. However, if desired, the hook member may be formed integrally with the turntable. The abutment of the deck plate of the record player may comprise the motor spindle although a separate element such as a lug may be provided which is attached to and projects upwardly from the deck plate of the record player or is pressed out from the metal deck plate, if desired.

BRIEF DESCRIPTION OF THE DRAWINGS

The invention will now be described with reference to one example which is illustrated in the accompanying drawings in which.

DESCRIPTION OF THE PREFERRED EMBODIMENTS

Figure 1:
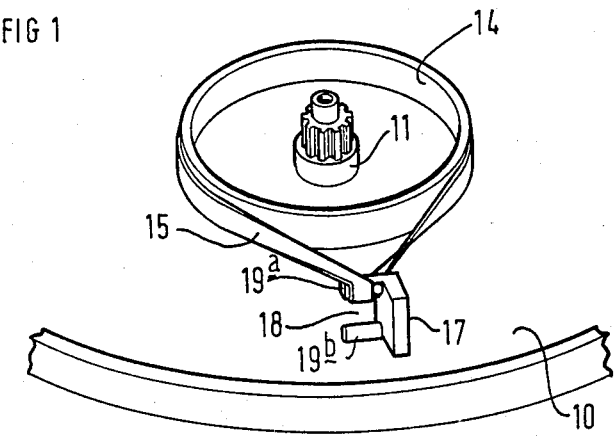
FIG. 1 shows a fragmentary perspective view of the underside of a turntable for use in performing the method according to the invention.

Referring to the drawings, a turntable 10 has provided on the underside thereof a centrally positioned downwardly projecting hub 11 by means of which the turntable is mounted for rotation upon a central mounting means comprising a post 12 (FIG. 2) which projects upwardly from a deck plate 13 of the record player.

Also secured to the turntable 10 is a drum 14 around which is engaged a drive belt 15 comprising a rubber band. If desired, the drum may be formed integrally with the turntable 10.

When the record player is in operative use, the belt 15 is engaged around a driving spindle 16 of an electric motor M, which spindle 16 projects upwardly from the electric motor M which is mounted beneath the deck plate 13.

Adhesively secured to the underside of the turntable 10 is a holding means comprising a hook member 17 which has an open mouth 18 which faces anti-clockwise when the turntable 10 is positioned underside downwards, which open mouth 18 is defined between two free ended horizontally extending limbs 19a, 19b, the limb 19b lying adjacent the underneath surface of the turntable 10. The limb 19a is of rounded configuration so as not to damage the belt 15 when engaged therewith.

If desired, the holding means may be formed integrally with the turntable 10 or pressed up outwardly therefrom and may be of other configuration to that described.

Figure 2:
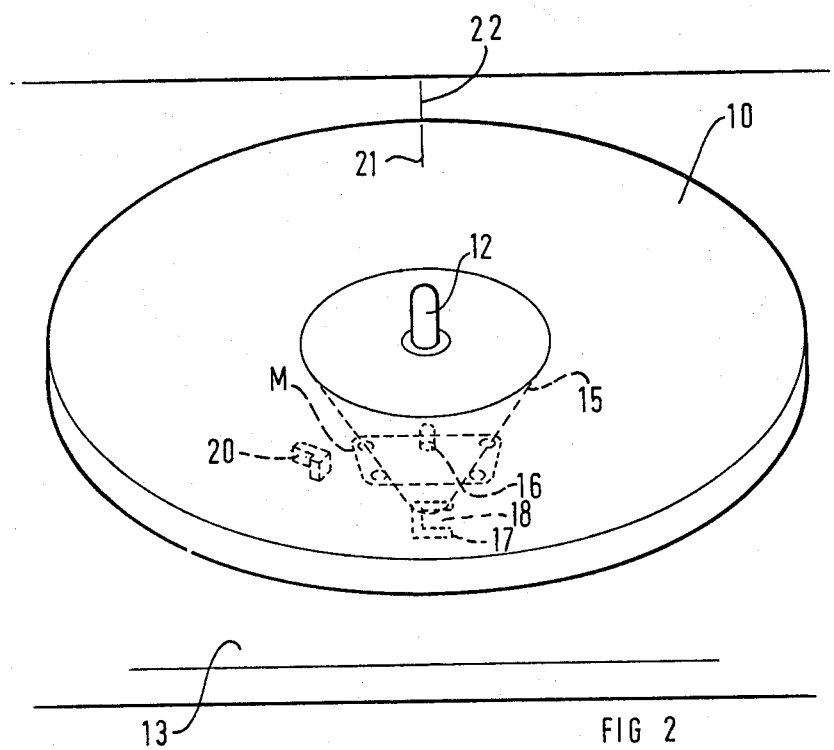
FIG. 2 is a perspective view of part of a record player including the turntable of FIG. 1 in engagement with a mounting means.

To enable the method according to the first aspect of the invention to be performed, the only other additional element required is an abutment element which projects upwardly from the deck plate 13. This may comprise the driving spindle 16 of the motor M itself, or, as shown in FIG. 2 a separate lug 20 which projects upwardly from the deck plate 13. The position of this lug 20 is such that its radial distance from the central mounting post 12 is less than the radial distance of the hook member 17 from the post 12.

In carrying out the method of assembly of the belt drive, the turntable 10 is first taken separately from the record player and then, conveniently, in an inverted position as shown in FIG. 1, the belt 15 is engaged around the drum 14. A portion of the belt is then manually pulled away from the periphery of the drum 14 and engaged over the limb 19a of hook member 17 as shown in FIG. 1 to form a V-formation.

During the performance of the method, the belt 15 is held in this position by virtue of the tension due to the resilience of the rubber material from which it is made, created in pulling out the V-formation portion and hooking it over the limb 19a.

On its upper surface, the turntable has an index mark 21 radially diametrically opposite to the hook member 17, and the deck plate 13 has a further index mark 22 radially diametrally opposite to the motor spindle 16. The turntable 10 is presented to the deck plate 13, underside downward, and positioned so that these index marks 21 and 22 are aligned so that when the turntable is engaged with the central hub 11 over the mounting post 12, the motor spindle 16 is received within a triangular space defined by the V-formation of the portion of the belt 15 engaged with the hook member 17, and the arcuate drum periphery.

The turntable 10 is then rotated by hand in a clockwise direction and, in the embodiment of FIG. 2, this causes one side of the V-formation of the belt 15 to engage the lug 20 thus causing displacement of the apex of the V-formation portion along the limb 19a of the hook member 17 and out of engagement therewith. Thus the belt 15 is permitted to retract and engages the driving spindle 16.

In another embodiment, where the abutment element comprises the driving spindle 16 itself, when the turntable is rotated clockwise, the inside of the belt 15 will engage the spindle 16 and pull the V-formation portion from the hook member 17.

If required, the open mouth 18 of the hook member 17 may face clockwise when the turntable is in an underside downwards orientation. In this case, it would be necessary to rotate the turntable anti-clockwise in order to disengage the V-formation portion from the hook member 17. In either case a more convenient and improved method of assembly of a belt drive is achieved.

Further, the invention is capable of being used with virtually any design of record player of the type specified as it requires the provision only of a hook member on the underside of the turntable and, if required, a simple projecting lug on the deck plate of the record player which each may conveniently be adhesively secured in position as described above.

However, if desired, a turntable and/or a deck plate may be provided with suitable integral pressed-out parts to provide a hook formation and/or an abutment if required.

As there are no apertures in the turntable, the provision of a turntable mat to conceal apertures in the turntable, is not required.

Figure 3:
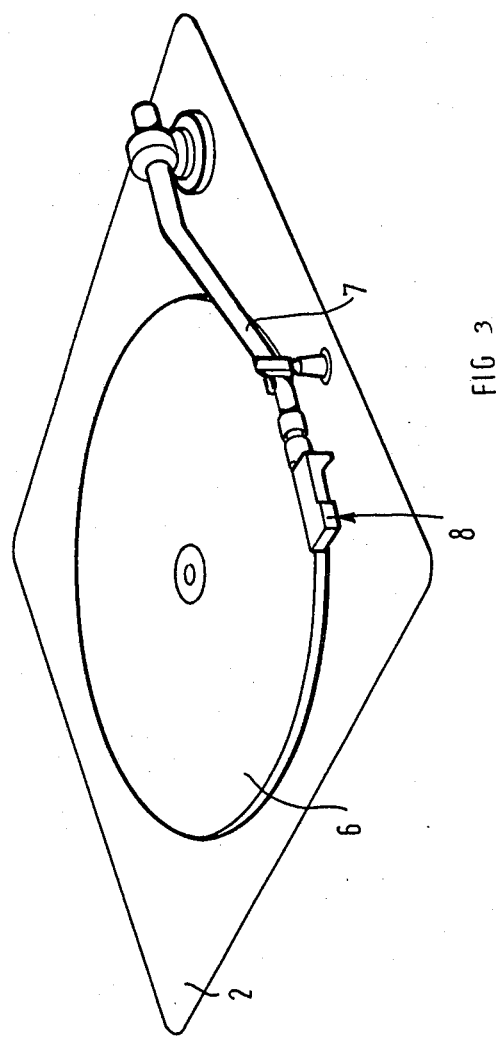
FIG. 3 is a perspective view of a known record player.

FIG. 3 shows a typical record player with which the above described invention could be used. The record player has a deck plate 2, turntable 6 and tone arm 7 which carries a transducer 8.

I claim:

1. A record player of the type having a belt drive in which an endless resilient belt passes around a motor driving spindle which extends from a deck plate, and around a drum provided on the underside of a turntable, the turntable being mounted for rotation on a mounting means provided on the deck plate, further comprising a turntable having a temporary belt holding means on the underside of said turntable comprising a member having a first end extending away from the turntable underside and a second end attached to said underside and further including a holding portion comprising a free ended portion attached at one end to the first end of said member and extending non-radially perpendicularly to the rotational axis of the turntable, the holding means being spaced radially outwardly of the drum of the turntable and the motor driving spindle of the deck plate, and an abutment projecting upwardly from the deck plate of the record player and positioned radially outwardly of the drum and inwardly of the holding means.

2. A record player according to claim 1 wherein said member of the holding means comprises a limb of a simple hook to noncaptively hold a portion of the belt by virtue of the tension of the belt, and permit easy displacement of the belt portion from the hook when a side of the belt portion engages the abutment of the deck plate when the turntable is rotated.

3. A record player according to claim 2 wherein the hook is separate from the turntable and is attached to the underside thereof.

4. A record player according to claim 2 wherein the hook is formed integrally with the turntable.

5. A record player according to claim 1 wherein the free end of the member faces anti-clockwise to enable the turntable to be rotated clockwise to cause said portion of the belt to disengage the member.

6. A record player according to claim 1 wherein the free end of the hook faces clockwise to enable the turntable to be rotated anti-clockwise to cause said disengagement.

7. A record player according to claim 1 wherein the abutment of the deck plate of the record player comprises the motor spindle.

8. A record player according to claim 1 wherein the abutment of the deck plate comprises a separate element which is attached to and projects upwardly from the deck plate of the record player.

9. A method of assembling a belt drive of a record player of the type having a belt drive in which an endless resilient belt passes around a motor driving spindle which extends from a deck plate, and around a drum provided on the underside of a turntable, the turntable being mounted for rotation on a mounting means provided on the deck plate comprising the steps of engaging the belt around the drum with the turntable separated from the record player, engaging a portion of the belt under tension with a temporary belt holding means on the underside of said turntable comprising a member having a first end extending away from the turntable under side and a second end attached to said underside and further including a holding portion comprising a free ended portion attached at one end to the first end of said member and extending non-radially perpendicularly to the rotational axis of the turntable, said portion of the belt forming a V formation in relation to the arcuate drum periphery, presenting the turntable, underside downwards, to the deck plate, of the record player, positioning the turntable in relation to the deck plate, of the record player, positioning the turntable in relation to the deck plate so that the motor driving spindle is received within the V formation, engaging the turntable with the mounting means and rotating the turntable about said axis to bring one side of the V formation into engagement with an abutment extending upwardly from the record player deck plate and positioned radially outwardly from the drum and inwardly of said holding means, whereby said portion of the belt is caused to disengage the holding means by sliding from the member so that said portion engages with the spindle of the driving motor.

* * * * *